Jan. 18, 1949.  V. WEBER  2,459,350
AUTOMATIC REVERSING CONTROL FOR ELECTRIC MOTORS
Filed Aug. 6, 1943  2 Sheets-Sheet 2

INVENTOR.
VICTOR WEBER.
BY Albert J. Henderson
his ATTORNEY.

Patented Jan. 18, 1949

2,459,350

UNITED STATES PATENT OFFICE 2,459,350

AUTOMATIC REVERSING CONTROL FOR ELECTRIC MOTORS

Victor Weber, Greensburg, Pa., assignor to Robertshaw-Fulton Controls Company, a corporation of Delaware Application August 6, 1943, Serial No. 497,613

4 Claims. (Cl. 318—31)

This invention relates to temperature controlling systems and, more particularly, to thermostatic controls for shutter or cowl flap actuating mechanisms which regulate the temperature of the cooling systems of motor driven vehicles, such as aircraft and the like. In my copending application, Serial No. 489,180, filed May 31, 1943, of which the present application is a continuation-in-part, there is disclosed and claimed a control of the type described which includes means for preventing fluttering of the armature of the relay provided in the circuit of the reversible electric motor which operates the shutter. In the said copending application no provision was made in the system for alternative manual and thermostatic control of the shutter movement and no limit switches were included in the circuit there disclosed. This invention includes such features together with other improvements in the general arrangement of parts as will be apparent hereinafter.

An object of this invention is to control shutter or cowl flap actuating mechanism by a system of alternative manual or thermostatic means.

Another object of the invention is to combine such forms of control in the unit so that a defect in one will not affect the proper functioning of the other.

Another object of the invention is to prevent damage from over-running by providing automatic limit stop means independent of the manual or thermostatic control.

Another object of the invention is to render the device substantially unaffected by vibration from outside sources.

Other objects and advantages will become apparent from the following description taken in connection with the accompanying drawings, wherein Fig. 1 is a schematic view of the temperature controlling device in conjunction with a wiring diagram of the electrical circuit used therewith.

Fig. 3 is a side elevation of a detail.

Figure 1:
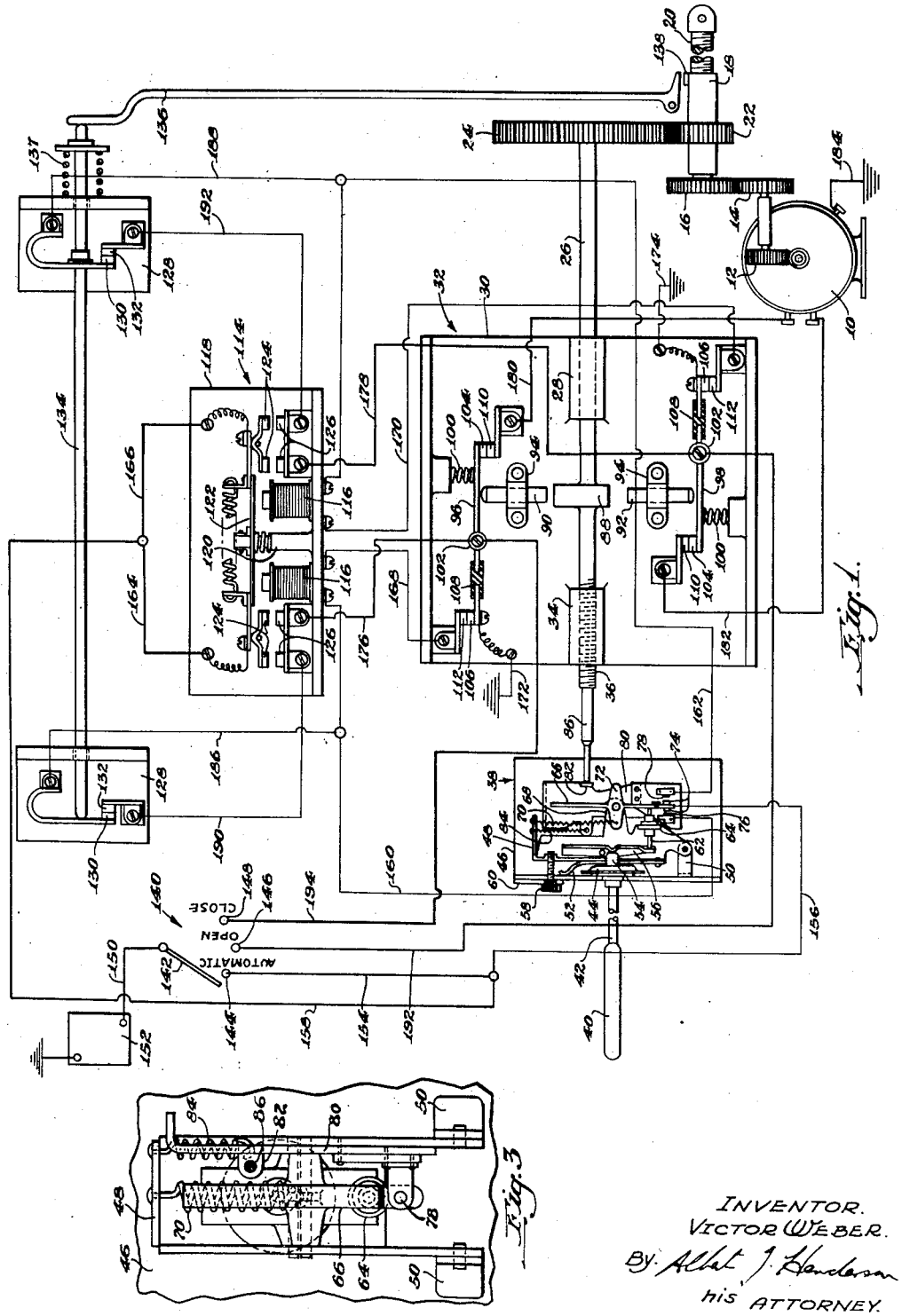

Referring more particularly to the drawing, the reversible electric motor 10 operates, through the worm gear 12 and reduction gears 14 and 16, the shaft 18 of the shutter mechanism (not shown). For the purposes of this description it will suffice to state that rotation of the shaft 18 causes reciprocation of a jack screw 20 to which the shutter or cowl flap mechanism is attached and which is thereby opened or closed to regulate the temperature of the cooling system. The shaft 18 is provided with a pinion 22 which drives a gear 24 attached to a travelling spindle 26 which revolves at a much slower speed than the shaft 18, as will be hereinafter apparent. The travelling spindle 26 is journalled in a bearing 28 which, in the schematic form shown in Fig. 1, is carried on a support 30 for the limit switch mechanism, designated generally by the reference numeral 32. A similar bearing 34 is carried in alignment with the bearing 28 on the support 30 but is threaded for engagement with a threaded portion 36 formed on the spindle 26.

Positioned in operative relation with the travelling spindle 26 is a thermostatic control device, designated generally by the reference numeral 38. The thermal unit of this mechanism comprises a bulb 40, capillary tubing 42 and expansible diaphragm 44 constituting a fluid type actuator. The diaphragm 44 is supported in a frame 46 which houses the thermostatic control mechanism. The bulb 40 located exterior of the frame 46 is adapted for immersion in the cooling liquid which circulates through the radiator of the vehicle. Hence, the device operates by changes in temperature at the bulb 40 causing expansion or contraction of the fluid therein and corresponding expansive or contractive movement of the diaphragm 44. Reference may be had to Fig. 3 for another view of this thermostat mechanism.

A sub-frame 48 of channel-form cross-section is pivotally mounted at one end on lugs 50 projecting inwardly of frame 46 and is urged away from the adjacent wall of the frame 46 by a leaf spring 52 which is secured at one end to the sub-frame 48 and has its free end engaging the wall of the main frame 46. The leaf spring 52 and sub-frame 48 are suitably apertured to permit a button 54 carried by the diaphragm 44 to pass freely therethrough into engagement with a thermostat lever 56. To counteract the bias of the spring 52 on the sub-frame 48, a calibrating screw 58 may threadedly engage the frame 48 at the end opposite the pivotal mounting thereof and extend through the wall of the frame 46 for convenient access from the exterior. An indicator plate 60 is carried on the frame 46 in operative engagement with the calibrating screw 58 to indicate the extent of adjustment of the frame 48.

The thermostat lever 56 is pivotally mounted between the side walls of the channel-shaped sub-frame 48 and is engaged on one side of its pivotal mounting by the button 54 of the thermal unit. Preferably, the pivotal mounting of the thermostat lever 56 is located on the axis thereof and the lever is thus supported in substantial balance or equilibrium on either side of its pivotal mounting. The button 54 which engages the lever is offset from the pivot and this engaged side of the lever also engages a pin 62 on the opposite surface to that engaged by the button. The pin 62 is mounted in a suitable bearing 64 formed inwardly of one side wall of the sub-frame 48 for reciprocation in a direction parallel with the axis of the diaphragm button 54. The opposite end of the pin 62 engages with a switch blade 66 which is pivotally mounted on oppositely disposed ears 68 projecting from the side walls of the channel-section frame 48. As in the case of the thermostat lever 56, the switch blade 66 is pivotally mounted on its axis for obtaining substantial balance therein.

A coil spring 70 is operative between an end wall of the sub-frame 48 and one end of a lug 72 formed on the switch blade 66 on either side of the pivotal mounting. Preferably, the lug 72 is symmetrical about the pivotal mounting of the switch blade 66 in order to maintain this element in substantial balance as described. The coil spring 70 serves to bias the switch blade 66 toward the pin 62 whereas expansive movement of the diaphragm 44 communicated through the button 54 to the thermostat lever 56 will serve to oppose this bias. The end of the switch blade 66, beyond the portion engaged by the pin 62, is insulated from the other portion and carries contacts 74 disposed on opposite faces thereof and adapted for engagement alternately, upon pendulum movement of the blade, with contacts 76 and 78 carried on a contact arm 80 and suitably insulated therefrom.

The contact arm 80 is interposed between the switch blade 66 and the ear 68 on one side of the frame 48 and may be pivoted on the latter in common with the switch blade 66. An abutment 82 is formed on the contact arm on the side of its pivotal mounting opposite the contacts 76—78 and is biased for clockwise movement as viewed in Fig. 1 by a coil spring 84 operative between the sub-frame 48 and an anchorage on the contact arm 80 on the same side of the pivotal mounting as the abutment 82. As in the case of the thermostat lever 56 and the switch blade 66, the contact arm 80 is preferably pivotally mounted on its axis for obtaining substantial balance therein.

The abutment 82 on the contact arm 80 is adapted to be engaged by a projecting portion 86 of the travelling spindle 26 and is urged into such relation by means of the coil spring 84. Upon rotation of the gear 24 from the motor 10 through gearing described, the travelling spindle 26 will revolve and, due to the threaded engagement of the portion 36 thereon with the threaded bearing 34, will reciprocate transversely of the shaft 18 causing pivotal movement of the contact arm 80 and consequent movement of the contacts 76—78 thereon with respect to the switch blade contacts 74.

As previously indicated, in addition to the structure for operating the shutter mechanism automatically according to the temperature of the cooling liquid as sensed by the thermostat bulb 40, this invention contemplates independent means for limiting movement of the shutter mechanism to prevent damage thereto should the thermostat mechanism overrun. It will be apparent that such independent means need only operate at the extremes of opening and closing movements of the shutter mechanism and that at intermediate positions the thermostat operation can safely be permitted to control.

Accordingly, as shown in the schematic embodiment of Fig. 1, the spindle 26 is provided intermediate the bearings 28 and 34 with a cam element 88 which may be formed integral with the spindle 26. The cam 88 is adapted to engage alternately with oppositely disposed pins 90—92 reciprocably mounted in bearings 94 carried by the frame 30. The ends of the pins 90—92 opposite the portion engageable by the cam 88 are adapted to engage with switch blades 96—98 which are biased into engagement therewith by means of coil springs 100 supported on the frame 30. The switch blades 96—98 are pivotally mounted intermediate their ends as at 102 and each carries a contact 104 at one end and a contact 106 at the other, these contacts being on opposite sides of the respective switch blades. Preferably, the contact 106 is insulated from the contact 104 by the provision of an insulating strip 108 for the switch blades 96—98 on the adjacent side of the pivotal mounting 102. The contacts 104 engage with fixed contacts 110 mounted on the frame 30 and the contacts 106 also engage with fixed contacts 112 similarly mounted. Movement of the contacts 104 and 106 into and out of engagement with the contacts 110, 112, respectively, will interrupt the respective operating circuits of the motor 10 as will be hereinafter described.

The motor circuit includes a relay, designated generally by reference numeral 114, and preferably of the double-throw, single-armature type fully described and claimed in my copending application, Serial No. 476,395, filed February 19, 1943, now Patent No. 2,398,681, dated April 16, 1946. In the schematic form of this relay structure shown in Fig. 1 the parts may comprise a pair of relay coils 116 suitably mounted in spaced relation on a frame 118 and between which a support 120 projects and forms a pivotal mounting for an armature 122 overlying both coils 116. The armature 122 carries contact pairs 124 at opposite ends thereof which are adapted to engage with fixed contact pairs 126 mounted on the frame 118.

In the embodiment shown in Fig. 1, electrically operated latching means are disclosed for maintaining the armature 122 of the relay in either of its attracted positions for a purpose which will be apparent hereinafter. To this end, a pair of interrupter switches 128 are provided and may each comprise a movable contact 130 and a fixed contact 132 which are normally in engagement. The movable contacts 130 may conveniently be operated to open contact position by a shaft 134 which extends between the switches in abutting relation therewith and has a projecting end maintained in engagement with one end of an operating lever 136 by means of a coil spring 137 which biases it to this position. The operating lever 136 is pivotally mounted and may be in the form of a bellcrank which has its opposite end operatively engaging with a cam element 138 formed on the shaft 18. It will be understood that the interrupter switches and operating means therefor disclosed in my copending application, Serial No. 489,180, filed May 31, 1943, could be substituted.

Positioned for convenient use by the vehicle operator is a main control switch designated generally by the reference numeral 140. This main control switch has a switch arm 142 movable to three positions, one position designated by the numeral 144 being the automatic control position wherein the thermostat can function to cause opening and closing of the shutter. The remaining two positions, designated by the numerals 146 and 148, are adapted for manual control instead of thermostatic; in position 146 serving to effect opening of the shutter mechanism, and in position 148 to cause closing thereof. Movement of the switch arm 142 to a neutral position, as shown in Fig. 1, serves as the "off" or circuit-breaking position. The switch arm 142 may be connected to a source of current, such as by a wire 150 to one terminal of a battery 152, the other terminal of which is connected to ground.

As the motor 10 is operated alternately in two directions and the circuit elements described have reverse positions, the electrical circuit to one winding of the motor may be a duplicate of that to the other and will be described in this manner. Thus, when the control switch 142 is in automatic position 144 the relay coil circuit may be traced from the source of current 152, wire 150, switch 142 in position 144, wire 154, wire 156 to switch contacts 74 of the thermostat mechanism. Switch contacts 74 may engage either of the contacts 76—78 of contact arm 80 and these latter contacts are connected by wires 160—162 to the relay coils 116 respectively. From the relay coils, the wires 168—170 lead to the fixed contacts 112 of the limit switch 32. Wires 172—174 connect the movable contacts 106, with which contacts 112 are associated, to ground.

The motor circuit may be traced from common wires 154 and 158 by wires 164—166 to the contact pairs 124 of the relay armature with which fixed contact pairs 126 cooperate. Wires 176—178 connect one contact of each of the pairs 126 with the switch blade contacts 104 of the limit switch 32. From contacts 110, with which the contacts 104 cooperate, wires 180—182 connect respectively with the motor windings. The motor is grounded by wire 184.

The interrupter switches 128 are connected in parallel circuit with the relay coils 116 by wires 186—188, contacts 130—132 and wires 190—192 connected to other one contact of each of the pairs 126 of the relay.

The circuit so far described constitutes the operating circuit when the switch arm 142 is in the automatic position 144. In the manual open position 146, a wire 192 will connect the source of current 152 with the movable contact 104 of one of the limit switches, while in the closed position 148 a wire 194 connects the source of current 152 with the movable contact 104 of the other limit switch. As wires 180—182 connect the fixed contacts 110 of this switch to the motor 10 it will be apparent that in either of the manual positions the entire automatic mechanism is disconnected from the circuit and the motor is energized from the battery 152 directly through the limit switch mechanism 32 only.

In the operation of the device shown in Fig. 1, with switch arm 142 in automatic position 144, it may be assumed that the temperature of the liquid in the cooling system rises and the bulb 40 which is immersed in the liquid communicates the temperature rise to the diaphragm 44 causing expansion thereof. The button 54 thereupon moves the thermostat lever 56 on its pivot and the switch arm 66 is thereby moved by the pin 62 into position where contacts 74 and 78 engage.

The relay coil circuit described is energized through the right-hand relay coil, as viewed in Fig. 1, and also through the contacts 112, 106 at the lower right-hand corner of the limit switch mechanism 32 through wire 174 to ground. The energization of the relay coil 116 will cause the armature 122 to be attracted, closing contacts 124—126 of the relay to complete the motor circuit described through limit switch contacts 104, 110 at the lower left-hand corner of the limit switch mechanism 32, as viewed in Fig. 1, and through the wire 182 to the motor 10. Concurrently with the completion of the motor circuit, the movement of the relay armature to attracted position will close a circuit from relay contacts 124—126, wire 192, interrupter switch contacts 130—132, wire 188, relay coil 116, wire 170, limit switch contacts 112—106 and wire 174, to ground. This latter circuit serves to form a shunt for the relay coil 116.

Operation of the motor will cause longitudinal movement of the travelling spindle 26 toward the left, as viewed in Fig. 1, to pivot the contact arm 80 while switch blade 66 maintains contacts 74—78 in engagement. However, after the shutter or cowl flap mechanism has been moved in an opening direction by operation of the jack screw 20 a certain distance, the spindle 26 will move contact arm 80 on its pivot far enough in a counter-clockwise direction, as viewed in Fig. 1, to open the contacts 74—78, it being assumed that the diaphragm has ceased expanding and switch blade 66 is stationary.

While, under such conditions, the relay coil circuit comprising contacts 74—78, wire 162, relay coil 116, wire 170, limit switch contacts 112—106 and wire 174 to ground, is discontinued by opening of the contacts 74—78, the relay armature 122 does not return to its neutral or unattracted position. It will be apparent that the shunt circuit for the relay coil 116, established by relay contacts 124—126, wire 192, interrupter switch contacts 132—130, wire 188 to relay coil 116 and then by the described circuit to ground, will serve to maintain the relay aramature in its attracted position. However, after the expiration of a timed period, the cam 138 on shaft 18 will operate the bell-crank lever 136 to open the interrupter switch 128 and cause return of the relay armature 122 to its neutral position.

The gearing between the shaft 18 and travelling spindle 26 is arranged so that the shutter or cowl flap mechanism is moved between full-open and full-closed positions during the time that spindle 26 makes an almost complete revolution. The shaft 18, therefore, revolves much faster than spindle 26 and completes several revolutions during the period. Accordingly, the cam 138 is located on shaft 18 in such relation to the radial position of the bell-crank lever 136 which it operates that after the spindle 26 has travelled a certain distance the appropriate interrupter switch 128 is operated.

As it is contemplated that the motor 10 may be energized by direct current it will be apparent that the movement of the contact arm 80, as described, to open the contacts 74—76, or 74—78, as the case may be, will tend to produce a slight arc between these contacts. Such arcing effect may be momentarily sufficient to cause retention of the relay armature 122 in its attracted position and immediately thereafter may be insufficient to cause it to retain such position. A chattering of the armature would then result but such effect is eliminated by the provision of the shunt circuit which maintains the armature in its attracted position during initial separating movement of the contacts 74—78 by operation of the thermostat.

It will be apparent that the degree of revolution of shaft 18 before cam 138 operates the interrupter switch constituting the electrical latching device is dependent upon the relative positions of these parts when shaft rotation begins. However, two or more cams could be provided to reduce the extreme degree of shaft rotation to less than one revolution before the latching device is operated. In any event, even if the thermostat is satisfied and further movement of the shutter is not required, the completion of the revolution of shaft 18 to operate the latch will not cause an increased movement of the shutter of any consequence due to the greater speed of rotation of shaft 18 relative to spindle 26 as described.

It will furthermore be apparent that there are provided two circuits which will maintain the relay in attracted position, one such circuit being completed by engagement of contacts 74—76 or 74—78 of the thermostatic mechanism and the other being the shunt circuit established around the relay coil by the interrupter switches 128. Hence, although the relay coil circuit may be energized either when the thermostatic switch contacts 74—78 or 74—76 are engaged or when these contacts are separated, it is apparent that the operation of the relay armature 122 to either of its attracted positions must be initiated by closing of the thermostatic switch contacts. Thus, after the armature has once moved to its attracted position the shunt circuit of interrupter switch 128 will assume the function of maintaining the attracted position of the relay armature when the thermostat switch contacts open but is itself incapable of causing the movement to attracted position. If the thermostatic switch contacts are closed when the interrupter switch opens the shunt circuit the shutter will continue its movement as the relay armature remains attracted.

If the temperature at the bulb 40 continuously increases throughout the extent of movement of the contact arm 80 and switch blade 66, then the motor 10 will continue to run until an almost complete revolution of the spindle 26 occurs. Under such conditions the cam 88 carried by the spindle 26 will engage with one or the other of the pins 90—92, as the case may be, and cause opening of the limit switch contacts 104—110. Such movement of the limit switch contact arms 96 or 98 will also cause opening of the contacts 106—112. Thus, at the same time as the motor circuit is deenergized by operation of the limit switch contacts 104—110 the circuit of the relay coil 116 is also deenergized by operation of the contacts 106—112. The relay armature 122 then returns to neutral position and is movable to either attracted positions for closing the circuit to the motor 10 for operation in either direction.

When the liquid in the cooling system to which the bulb 40 is exposed becomes cooler and the diaphragm 44 contracts, then the thermostat lever 56 will cause switch arm 66 to close contacts 74—76 of the thermostat mechanism. The circuit through the relay coil and motor 10 for operating the shutter or cowl flap mechanism in a closing direction is similar to that previously described for the opening direction. Accordingly, as the system will operate in the same manner whether contacts 74—78 or 74—76 of the thermostat mechanism are closed, further description is deemed unnecessary.

As previously indicated, the automatic operation of the system may be dispensed with by movement of the main control switch 142 to either of the manual operating positions 146 or 148. To open the shutter or cowl flap mechanism the contact arm 142 is engaged with position 146 whereas to effect closing operation the position 148 is used. In either position the circuit described from the source of current 152 to the motor 10 includes only the limit switch mechanism 32 and the other circuit elements used in connection with the automatic position are dispensed with. Thus, the danger of a feed-back through the system in the event that the relay armature 122 sticks in attracted position is eliminated.

Figure 2:
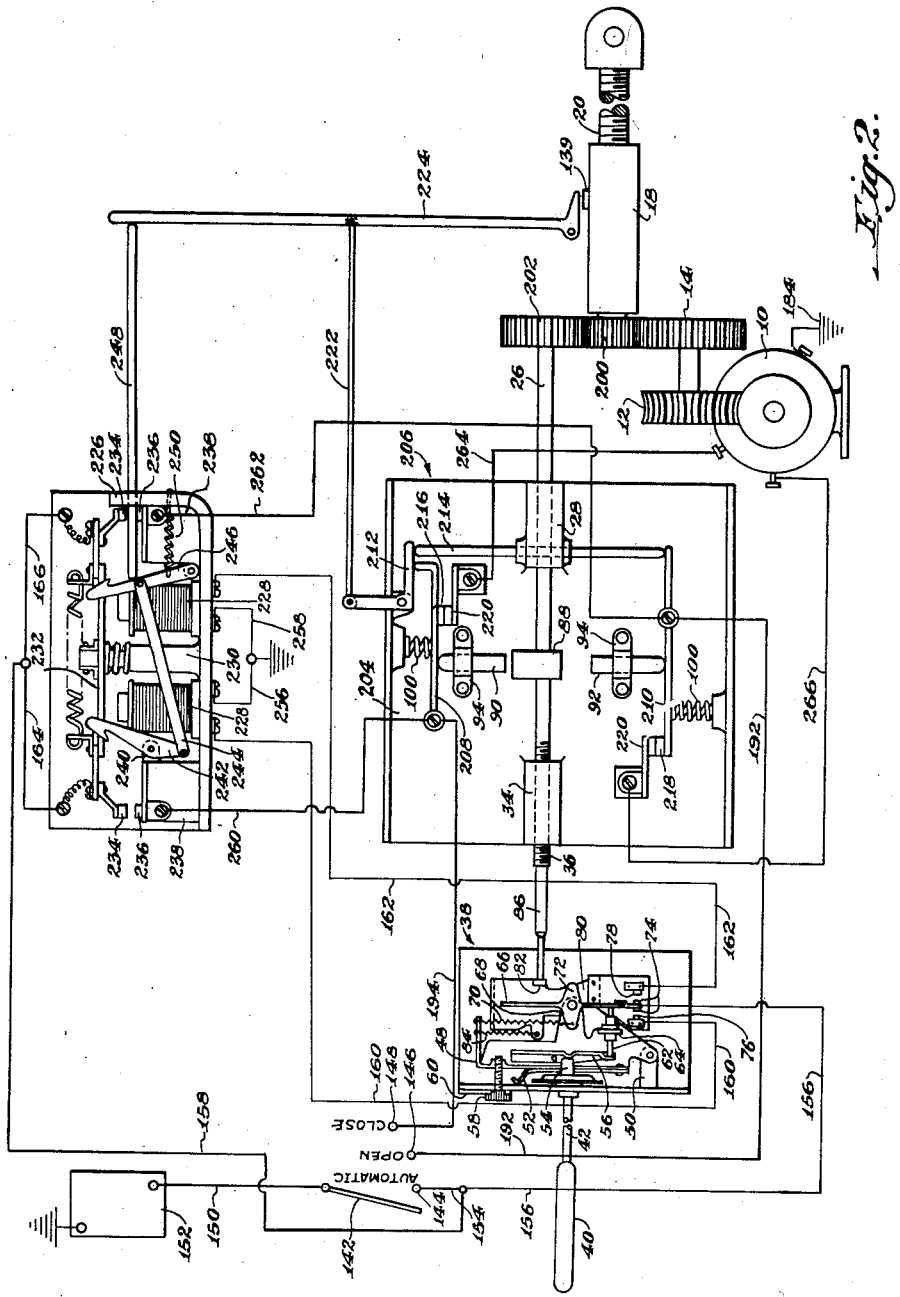
Fig. 2 is a similar schematic view of a modified form.

A mechanical device for maintaining the relay armature in attracted position for a timed period after opening of the thermostatic switch contacts is disclosed in the embodiment shown in Fig. 2. In this system similar reference numerals have been used to denote parts corresponding to those shown in Fig. 1. Generally, the thermostatic mechanism remains the same; the relay structure and limit switches are changed, and the interrupter switches are eliminated. In the embodiment of Fig. 2, therefore, a reversible electric motor 10 is provided for operating the shaft 18 through the worm gear 12 and reduction gears 14 and 200; the latter gear being shown as integral with the shaft 18. The gear 200 drives a gear 202 attached to the travelling spindle 26 which may be in all respects identical with that disclosed in Fig. 1. The travelling spindle 26 is journalled in a bearing 28 carried on a support 204 for the limit switch mechanism which is designated in this embodiment by the reference numeral 206. The threaded portion of the travelling spindle 26 engages with a threaded bearing 34 carried on the support 204 in alignment with bearing 28 and the projecting end of the spindle 26 engages with the abutment 82 on contact arm 80 of the thermostatic mechanism.

The cam 88 carried on the travelling spindle 26 engages alternately with the pins 90 and 92 to operate the opposed switch arms 208—210 of the limit switch mechanism. The switch arm 208 is pivoted at one end on the support 204 and the opposite end thereof is upturned to engage with a bell-crank lever 212. The bell-crank lever 212 is pivotally mounted on the support 204 and has the end which engages the upturned end of the switch arm 208 also engaging a pin 214 reciprocally mounted in the bearing 28 transversely of the travelling spindle 26. The opposite end of pin 214 projecting from the bearing 28 engages with one end of the contact arm 210 which is pivotally mounted intermediate its ends on the support 204. Both contact arms 208 and 210 are biased into engagement with the pins 90 and 92 by springs 100.

The switch arm 208 carries a contact 216 between the upturned end and the portion engaged by the pin 90. Contact arm 210 carries a contact 218 on the end opposite the portion engaged by the pin 214. Contacts 216 and 218 are normally engaged with fixed contacts 220 mounted on the support 204 and are adapted to be disengaged therefrom by operation of the pins 90 and 92 by the cam 88.

The opposite end of the bell-crank lever 212 carries a lever arm 222 pivotally mounted thereon and similarly mounted at its opposite end on an operating lever 224 similar to the lever 136 in the previous embodiment. The operating lever 224 may also be in the form of a bell-crank having its opposite end positioned to be engaged by the cam 139 carried by the shaft 18.

The latching device for the relay in this embodiment may be similar to that disclosed and claimed in my copending application, Serial No. 489,180, hereinbefore referred to. Accordingly, a base 226 carries a pair of relay coils 228 spaced one from the other and having a support 230 projecting therebetween. Pivotally mounted on the support 230 is an armature 232 carrying contacts 234 on each end thereof. These contacts are adapted to be moved into and out of engagement with fixed contacts 236 which are mounted on insulating pads 238 on the base 226, such movement being caused by operation of the armature 232 into either of its attracted positions. One of the insulating pads 238 is provided with a lug 240 upon which a latching arm 242 is pivotally mounted intermediate its ends. The latching arm 242 extends into engaging relation with the armature 232 and is provided with a suitably shaped end for latching engagement therewith when the armature is in attracted position. The opposite end of the latching arm 242 carries a cross arm 244 which pivotally engages with a second latching arm 246 having a similarly shaped end for engagement with the opposite end of the armature when in its other attracted position. The latching arm 246 is engaged by an operating bar 248 reciprocally mounted on the base 226 and projecting therefrom into engagement with the operating lever 224. A coil spring 250 mounted between the latching arm 246 and the base 226 serves to bias the arm into engagement with the operating bar 248.

The circuit arrangement for this embodiment of the invention may comprise a source of current 152, with wire 150 leading therefrom to the main control switch arm 142. In the automatic position 144 the circuit may be traced by way of wires 154—156 to the switch contacts 74 of the thermostat mechanism. The contacts 76—78 of contact arm 80 with which contacts 74 cooperate are connected by wires 160—162 to the pair of relay coils 228, respectively. The relay coils are grounded by the wires 256—258, thus completing the relay coil circuit.

The motor circuit in this embodiment includes common wires 154—158 and wires 164—166 to the relay contacts 234 of the relay armature 232. Wires 260—262 connect the fixed contacts 236 of the relay to contacts 216 and 218, respectively, of the limit switch mechanism. Contacts 220 of the limit switch with which contacts 216—218 cooperate are connected by wires 264—266 to the motor windings. The motor is grounded by the wire 184 as in the previous embodiment.

In the operation of the mechanical form of latching device for the relay described in connection with Fig. 2, it is apparent that the shaft 18 which completes several revolutions for every revolution of the travelling spindle 26 will operate the latching device through the medium of the levers described. Thus, assuming that the thermostatic switch mechanism has operated through the circuit described and caused the relay armature 232 to be attracted, then the latching arm 242 or 246, as the case may be, will have moved into position to retain the armature in such attracted position. As the cam 139 carried by shaft 18 moves into engagement with the bell-crank lever 224 upon every revolution of the shaft 18, the latching device will be released for an instant. If then the thermostatic switch mechanism is in the open contact position and the circuit through the relay coil is deenergized, the relay armature 232 will return to its neutral position. If, however, the thermostatic switch mechanism is in closed contact position, then the operation of the latching mechanism by the cam 139 will not affect the position of the armature which remains attracted.

Since the limit switches 206 in this embodiment are controlling the motor circuit it is essential that the latching device for the relay be released whenever the limit switches operate to open the circuit. In the absence of such provision it will be apparent that the relay armature would remain locked in attracted position, although the shutter or cowl flap mechanism had reached the extreme of movement, either closed or open, and the motor was deenergized. As the next movement of the shutter mechanism would have to be in the opposite direction by reversed motor operation, the relay armature would necessarily have to reverse its position before the circuit for such operation of the motor could occur. Hence, provision is made in this invention for interconnecting the limit switch mechanism with the latching device for the relay.

To this end, when the pin 90, for example, is operated by the cam 88 to open contacts 216—220, then the upturned end of the contact arm 208 will cause the bell-crank lever 212 to pivot and move the lever 224 through the connecting lever 222. When the lever 224 is moved, as described, the effect is similar to movement of this lever by the cam 139 and the latching device is released. In a similar manner operation of the pin 92 by the cam 88 to open contacts 218—220, will cause the end of the pivoted contact arm 210 to move the bell-crank lever 212 through the medium of the pin 214. This movement of the bell-crank lever 212 will cause the above described movement of the latching device as will be apparent. The armature immediately returns to neutral position ready to be moved to attracted position.

As in the previously described embodiment, the manual positions 146 and 148 are so connected with the motor 10 that the circuit includes only the limit switch mechanism 206. Accordingly, wire 192 connects position 146 with limit switch contacts 218—220 and wire 266 completes the circuit from these contacts to the motor 10. In position 148, wire 194, switch contacts 216—220 and wire 264 serve a similar purpose. Thus, in this embodiment also there is no danger of feedback through the system if the relay armature 232 becomes fixed in an attracted position.

The invention includes means for eliminating to a considerable extent the effect of vibration of the aircraft or other vehicle on which the system is installed which might have deleterious effects on the operation of the thermostatic mechanism. The thermostat lever 56, switch arm 66 and contact arm 80 are all in substantial balance as described and, accordingly, the operation thereof should be unaffected by the conditions under which the device is used.

It will be understood that various changes may be made in the arrangement and combination of parts and that the schematic embodiment is subject to various modifications in form within the scope of the appended claims without departing from the spirit of the invention.

I claim:

1. A control system for cowl flap or shutter actuators, comprising driving means for the actuator, a control device movable between positions for starting and stopping said driving means actuating means for said control device and being operable to stop said driving means, thermally responsive means for operating said control device between said positions to start said driving means, an auxiliary control device operable in response to movements of the first said device from one position to another, means responsive to operation of said auxiliary device for maintaining said driving means in driving operation irrespective of subsequent movement of said control device by said actuating means from said one position to another to stop said driving means, means operated from said driving means and cooperable with said control device for rendering said maintaining means ineffective after a predetermined period but being adapted to cause said driving means to stop only when said control device is in position to stop said driving means, and a position limit control operable from said driving means for stopping operation of said driving means and concurrently causing another operation of said auxiliary control device to render said maintaining means ineffective independently of said control device.

2. A control system comprising rotatable driving means, a relay having a coil and an armature operable thereby between open and closed positions relative to a plurality of relay contacts, a source of electrical energy, a control device having a plurality of pivotally mounted contacts operable between open and closed positions, means responsive to variations in a variable condition for causing said control device to operate said pivotally mounted contacts to closed position, actuating means adapted to be driven from said driving means and being operatively associated with said control device for causing the same to operate said pivotally mounted contacts from closed to open position, a first circuit including said source and said coil and controlled by operation of said pivotally mounted contacts, a second circuit including said source and said driving means and controlled by operation of said armature relative to a pair of said relay contacts, a shunt circuit for said control device established by operation of said armature relative to one of said pair of relay contacts and another one of said relay contacts, said shunt circuit being adapted to continue said second circuit irrespective of the subsequent discontinuance of said first circuit by operation of said pivotally mounted contacts, and interrupter switch means operated intermittently from said driving means and located in said shunt circuit for opening the same after a predetermined period, said interrupter switch means being cooperable with said control device for causing operation of said armature to open said relay contacts but only when said pivotally mounted contacts are in open position.

3. A control system comprising an electric motor, a control circuit for said motor including switching means movable between positions for controlling said circuit, electromagnetic means for operating said switching means, an energizing circuit for said electromagnetic means including a control device operable for controlling said energizing circuit, thermally responsive means for causing operation of said control device for movement of said switching means to one of said positions, actuating means adapted to be positioned by said motor for causing operation of said control device for effecting movement of said switching means to another said position, a holding circuit for said electromagnetic means established upon operation of said switching means to said one position, and interrupter switch means included in said holding circuit and adapted to be positioned by said motor for discontinuing said holding circuit after a predetermined period of said motor operation, said interrupter switch means being cooperable with said control device for effecting movement of said switching means to said other position but only when said actuating means is in said position.

4. A control system comprising an electric motor, a control circuit for said motor including switching means movable between positions for controlling said circuit, electromagnetic means for operating said switching means, an energizing circuit for said electromagnetic means including a control device operable for controlling said energizing circuit, thermally responsive means for causing operation of said control device for movement of said switching means to one of said positions, actuating means adapted to be positioned by said motor for causing operation of said control device for effecting movement of said switching means to another said position, a holding circuit for said electromagnetic means established upon operation of said switching means to said one position, interrupter switch means included in said holding circuit and adapted to be positioned by said motor for discontinuing said holding circuit after a predetermined period of said motor operation, said interrupter switch means being cooperable with said control device for effecting movement of said switching means to said other position but only when said actuating means is in said position, and position limit switch means included in both said control circuit and said energizing circuit and adapted to be positioned by said motor for concurrently discontinuing the last said circuits independently of said control device.

VICTOR WEBER.

REFERENCES CITED

The following references are of record in the file of this patent:

UNITED STATES PATENTS

| Number | Name | Date |
|---|---|---|
| 362,212 | Guion | May 3, 1887 |
| 435,898 | Johnson | Sept. 2, 1890 |
| 995,036 | Shepherd | June 13, 1911 |
| 1,835,907 | Shiland | Dec. 8, 1931 |
| 2,077,086 | Adair | Apr. 13, 1937 |
| 2,250,437 | Persons | July 22, 1941 |
| 2,277,560 | Raney | Mar. 24, 1942 |
| 2,296,374 | Weber | Sept. 22, 1942 |
| 2,314,937 | Hannon | Mar. 30, 1943 |
| 2,354,364 | Chapman | July 25, 1944 |